United States Patent [19]

Seki et al.

[11] Patent Number: 5,728,790
[45] Date of Patent: Mar. 17, 1998

[54] THERMOSETTING POWDER PAINT, COATING METHOD USING SAID PAINT, AND ARTICLE COATED WITH SAID PAINT

[75] Inventors: Masashi Seki; Eiichi Kawasaki; Takayoshi Sekido; Mitsuyuki Mizoguchi; Takahisa Miyawaki; Kousuke Suewaka, all of Kanagawa-ken, Japan

[73] Assignee: Mitsui Toatsu Chemicals, Inc., Tokyo, Japan

[21] Appl. No.: 510,848

[22] Filed: Aug. 3, 1995

[30] Foreign Application Priority Data

Aug. 11, 1994 [JP] Japan .................................. 6-189208
Dec. 28, 1994 [JP] Japan .................................. 6-327739

[51] Int. Cl.$^6$ .................. C08F 224/00; C08F 226/02; C08F 222/02; C08F 212/08; B05D 1/06; B32B 15/16
[52] U.S. Cl. .................. 526/273; 526/310; 526/318.2; 526/347; 427/475; 428/98
[58] Field of Search .................. 526/273, 310, 526/318.2, 347; 427/475; 428/98

[56] References Cited

U.S. PATENT DOCUMENTS

| | | |
|---|---|---|
| 3,845,016 | 10/1974 | Labana et al. . |
| 3,893,977 | 7/1975 | Wingler .................. 526/273 |
| 3,919,346 | 11/1975 | Katsimbas . |
| 3,919,347 | 11/1975 | Katsimbas . |
| 4,051,194 | 9/1977 | Ishikawa et al. .................. 526/273 |

FOREIGN PATENT DOCUMENTS

| | | |
|---|---|---|
| 49-34546 | 3/1974 | Japan . |
| 50-51542 | 5/1975 | Japan . |
| 58-2983 | 1/1983 | Japan . |
| 63-165463 | 7/1988 | Japan . |
| 5-112743 | 5/1993 | Japan . |
| 5-132634 | 5/1993 | Japan . |

OTHER PUBLICATIONS

Pitture e Vernici Europe Apr. 49, pp. 5–10.

Primary Examiner—Joseph L. Schofer
Assistant Examiner—Wu C. Cheng
Attorney, Agent, or Firm—Burns, Doane, Swecker & Mathis

[57] ABSTRACT

The present invention relates to a thermosetting powder paint comprising, as essential components, (A) a copolymer of particular composition composed of a glycidyl group-containing monomer, styrene and other monomer copolymerizable therewith and, as curing agents capable of reacting with the component (A) to crosslink the component (A), (B) an aliphatic polycarboxylic acid and (C) a linear anhydride of an aliphatic polycarboxylic acid; a coating method using the above thermosetting powder paint; and a coated article obtained by using the above thermosetting powder paint. The above thermosetting powder paint, when used as a paint for automobile, has excellent storage stability and gives a coating film having excellent appearance, properties, weathering resistance and yellowing resistance; therefore, the paint can be favorably used particularly as an top coat and an intermediate coat for automobile and its parts.

28 Claims, No Drawings

;# THERMOSETTING POWDER PAINT, COATING METHOD USING SAID PAINT, AND ARTICLE COATED WITH SAID PAINT

BACKGROUND OF THE INVENTION

(1) Field of the Invention

The present invention relates to a thermosetting powder paint. More particularly, the present invention relates to a thermosetting powder paint which has excellent storage stability and low-temperature curability and which can form an after-cure coating film having excellent appearance (e.g. smoothness and sharpness), excellent physical properties (e.g. impact resistance, chipping resistance, scratch resistance and adhesivity), yellowing resistance (of course, the coating film right after curing has no yellowness), weathering resistance; ultraviolet light resistance and excellent chemical properties (e.g. acid resistance and solvent resistance).

The present invention further relates to a coating method using said paint and an article coated with said paint.

(2) Description of the Prior Art

[Trend of research and development in paint technology field viewed from ecology aspect, etc. and expectation for powder paint]

Solvent type paints have been used in coating of articles. To enable use in applications (e.g. automobiles) where severe quality requirements exist, paints satisfying various requirements have been developed and have actually been used.

In recent years, change of solvent type paint to powder paint has been expected in paint technology field from the standpoints of preservation of local or global environment, safe labor, improvement of environmental hygiene, prevention of fire and explosion, resource saving, etc.

As expectation for powder paints of high performance and various types became high owing to historical and social needs, it has become necessary for powder paints to be able to provide a coating film of excellent properties (e.g. impact resistance and acid rain resistance) comparable to that of solvent type paints.

While the requirements for coating film properties of powder paint have become severe as above, no powder paint fully satisfying such requirements is commercialized yet.

Specific examples of conventional powder paints include a bisphenol A-based epoxy resin powder paint and a polyester resin powder paint.

These powder paints, however, have problems not only in weathering resistance but also in acid rain resistance (which has recently become a high interest), and are not suitable for use in outdoor applications (e.g. automobile body).

Japanese Patent Application Kokai (Laid-Open) No. 34546/1974 discloses a powder paint in which curing is allowed to take place by a reaction between a glycidyl group-containing acrylic resin and an aliphatic dibasic acid (acting as a curing agent). This powder paint, however, gives an insufficient curing rate and must be cured under conditions of high temperature and long time. Moreover, the coating film formed therewith is insufficient in properties such as solvent resistance, adhesivity and the like.

Addition of a curing catalyst in a powder paint in order to solve the above problems invites other problems, i.e. insufficient smoothness of coating film and poor storage stability of paint. Alternatively, increase in density of functional groups (glycidyl group in acrylic resin and carboxyl group in curing agent) in order to enable low-temperature curing, invites other problems as well.

Many researches and developments have been conducted in order to solve the above-mentioned problems of conventional techniques. Japanese Patent Publication No. 2983/1983 discloses a powder paint in which crosslinking and curing is allowed to take place by a reaction between (1) a copolymer containing 5-20% by weight of a glycidyl group-containing monomer and (2) a compound having an acid anhydride group. When a copolymer containing 20% by weight or less of a glycidyl group-containing monomer is used, however, the resulting coating film is insufficient in crosslink density and therefore insufficient in properties including weathering resistance.

The compound having an acid anhydride group, used in the above powder paint is an aromatic or alicyclic acid anhydride, and has low compatibility with the copolymer. This acid anhydride generally has a high melting point and, when used as a curing agent, gives a coating film of insufficient properties (e.g. insufficient appearance and insufficient impact resistance).

Japanese Patent Application Kokai (Laid-Open) No. 165463/1988 discloses a thermosetting acrylic resin powder paint composition composed mainly of a particular functional (glycidyl group-containing) acrylic resin; an aliphatic dibasic acid (anhydride) and an alkyl titanate compound, which composition is melted and cured at low temperatures and which composition can give a coating film excellent in hardness, impact resistance, flex resistance, etc.

That is, there is disclosed, in the literature, a thermosetting acrylic resin powder paint composed mainly of (A) a functional (glycidyl group-containing) acrylic resin which is a copolymer composed mainly of an alkyl (1–14 carbon atoms) (meth)acrylate and glycidyl (meth)acrylate, (B) an aliphatic dibasic acid (preferably adipic acid, sebacic acid, decanedicarboxylic acid, muconic acid or the like) or a linear anhydride of a polycarboxylic acid and (C) an alkyl titanate compound represented by formula $Ti(OR)_4$ (R is an alkyl group of 15–20 carbon atoms), such as tetrapentadecyl titanate or the like.

In the above invention, no mention is made on combined use of an aliphatic dibasic acid [the component (B)] and an aliphatic dibasic acid linear anhydride as a curing agent component. With the above powder paint using only an aliphatic dibasic acid as a curing agent, the resulting coating film has an insufficient crosslink density and is inferior in solvent resistance, scratch resistance, appearance, etc. When only an aliphatic dibasic acid linear anhydride is used as a curing agent, the resulting paint has a problem in storage stability and the coating film formed therewith has problems in impact resistance, yellowing resistance, etc.

Japanese Patent Application Kokai (Laid-Open) No. 112743/1993 discloses a powder paint comprising a resin component containing an acrylic resin synthesized from a system containing at least 20% by weight of a glycidyl group-containing monomer and 35-50% by weight of styrene, and a curing agent component containing an aliphatic or alicyclic dicarboxylic acid or a linear anhydride thereof. The coating film formed therewith has excellent smoothness.

The above powder paint, however, has problems. With respect to the resin component, when the amount of styrene exceeds 30% by weight, the coating film formed therewith has yellowness and is inferior in yellowing resistance and weathering resistance.

With respect to the curing agent component, no mention is made on combined use of an aliphatic dicarboxylic acid and a linear anhydride thereof. When only a dicarboxylic acid is used, the coating film formed has problems in appearance and solvent resistance. When only a linear anhydride of a dicarboxylic acid is used, the resulting paint composition has a problem in storage stability and the coating film formed therewith has problems in yellowing, impact resistance, etc.

Japanese Patent Application Kokai (Laid-Open) No. 132634/1993 discloses a technique for forming a coating film in a conventional curing manner, using, as an acrylic resin component, a copolymer synthesized from a system containing a glycidyl group-containing monomer and tert-butyl (meth)acrylate and, as a curing agent component, the same compound as used in the above Japanese Patent Application Kokai (Laid-Open) No. 112743/1993.

The above technique, however, has a problem. Tert-butyl (meth)acrylate used together with a glycidyl group-containing monomer causes a side reaction with said monomer during polymerization, or causes thermal decomposition during polymerization or during solvent removal for polymer recovery, and tends to form an undesirable by-product in the form of a gel. The resulting powder paint composition containing such a gel gives a coating film having small lumps non-uniformly on the surface.

U.S. Pat. No. 3,845,016 discloses a method for forming a coating film by using, as an acrylic resin component, a copolymer synthesized from a system containing a glycidyl group-containing monomer, methacrylonitrile and methyl methacrylate and, as a curing agent component, a polyacid linear anhydride.

The method has problems. The powder paint composition containing the above copolymer as an acrylic resin component, used in the above method has inferior storage stability and the coating film formed therewith is inferior in gloss and smoothness. Further, no mention is made in the above literature on combined use of a dicarboxylic acid and a linear anhydride thereof as a curing agent component, and only a linear anhydride of a dicarboxylic acid is used in the above method; therefore, the paint composition has a problem in storage stability and the coating film formed therewith has problems in impact resistance and yellowing resistance.

U.S. Pat. Nos. 3,919,346 and 3,919,347 each disclose a method for crosslinking and curing a paint composition comprising, as an acrylic resin component, a copolymer synthesized from a system containing a glycidyl group-containing monomer and a hydroxyl group-containing monomer and, as a curing agent component, an anhydride of a dicarboxylic acid.

In either of these inventions, no mention is made on combined use of a dicarboxylic acid and an anhydride thereof as a curing agent component; and only an acid anhydride is used. Therefore, the paint composition has inferior storage stability and the coating film formed therewith has problems in impact resistance and yellowing resistance.

Japanese Patent Application Kokai (Laid-Open) No. 51542/1975 discloses a method for crosslinking and curing a paint composition comprising, as an acrylic resin component, a copolymer synthesized from a system containing a monomer having a glycidyl group in an amount of 5-20% by weight and, as a curing agent component, a dicarboxylic acid and a polyacid anhydride. However, when said copolymer contains a glycidyl group in an amount of 20% by weight or less, the coating film formed has an insufficient crosslink density and is inferior in properties and weathering resistance.

As stated above with respect to conventional techniques, when only an aliphatic polycarboxylic acid is used as a curing agent for glycidyl group-containing acrylic resin, the resulting paint composition is inferior in low-temperature curability and gives a coating film inferior in scratch resistance, acid resistance, solvent resistance, smoothness, sharpness, etc.; when only a linear anhydride of an aliphatic polycarboxylic acid is used, the resulting paint composition is inferior in storage stability and gives a coating film inferior in impact resistance, yellowing resistance, etc.; further in the latter case (using only a linear anhydride of an aliphatic polycarboxylic acid), the paint composition tends to give a coating film having popping and pinholes and, when used particularly as a transparent topcoat for automobile, gives a coating film of inferior appearance (inferior sharpness).

SUMMARY OF THE INVENTION

In view of the above-mentioned problems of conventional techniques, the present invention is intended to provide a thermosetting powder paint composition which has excellent storage stability and low-temperature curability and which can give an after-cure coating film having excellent appearance (e.g. smoothness and sharpness), excellent physical properties (e.g. impact resistance, chipping resistance, scratch resistance and adhesivity), excellent chemical properties (e.g. acid resistance and solvent resistance), weathering resistance, ultraviolet light resistance and yellowing resistance [all of these properties are required particularly for the topcoat and intermediate coat for automobile body and automobile parts (e.g. aluminum wheel, wiper, pillar and door handle)].

The present invention is also intended to provide a thermosetting powder paint composition which exhibits the above-mentioned excellent properties even when coated and cured on an aqueous basecoat.

The present invention provides a thermosetting powder paint comprising:
  (A) a copolymer obtained by polymerizing a system containing:
    (a1) more than 20 parts by weight but not more than 60 parts by weight of an ethylenically unsaturated monomer having, in the molecule, at least one glycidyl group and at least one unsaturated double bond,
    (a2) 1–30 parts by weight of styrene, and
    (a3) 10–79 parts by weight of an ethylenically unsaturated monomer having, in the molecule, neither carboxyl group nor tert-butyl ester group, the total of the monomers (a1), (a2) and (a3) being 100 parts by weight,
  (B) an aliphatic polycarboxylic acid, and
  (C) a linear anhydride of an aliphatic polycarboxylic acid.

The present invention further provides a thermosetting powder paint comprising:
  (A) a copolymer obtained by polymerizing a system containing:
    (a1) more than 20 parts by weight but not more than 60 parts by weight of an ethylenically unsaturated monomer having, in the molecule, at least one glycidyl group and at least one unsaturated double bond,
    (a2) 1–30 parts by weight of styrene, and
    (a3) 10–79 parts by weight of an ethylenically unsaturated monomer having, in the molecule, neither carboxyl group nor tert-butyl ester group, the total of the monomers (a1), (a2) and (a3) being 100 parts by weight,
  (B) an aliphatic polycarboxylic acid,
  (C) a linear anhydride of an aliphatic polycarboxylic acid, and (D) a salt between a tertiary amine compound and an organic acid, and/or (E) a tertiary amine compound having a melting point of about 20°–150° C.

The present invention furthermore provides a thermosetting powder paint according to any of the above inventions, wherein the copolymer (A) has a glass transition temperature of about 20°–100° C. as measured by Fox's formula and a number-average molecular weight of about 1,000–30,000.

DESCRIPTION OF THE PREFERRED EMBODIMENT

The present invention resides in a thermosetting powder paint comprising:

(A) a copolymer obtained by polymerizing a system containing:
   (a1) more than 20 parts by weight but not more than 60 parts by weight of an ethylenically unsaturated monomer having, in the molecule, at least one glycidyl group and at least one unsaturated double bond,
   (a2) 1–30 parts by weight of styrene, and
   (a3) 10–79 parts by weight of an ethylenically unsaturated monomer having, in the molecule, neither carboxyl group nor tert-butyl ester group, the total of the monomers (a1), (a2) and (a3) being 100 parts by weight, (B) an aliphatic polycarboxylic acid, and (C) a linear anhydride of an aliphatic polycarboxylic acid.

The present invention further resides in a thermosetting powder paint comprising:

(A) a copolymer obtained by polymerizing a system containing:
   (a1) more than 20 parts by weight but not more than 60 parts by weight of an ethylenically unsaturated monomer having, in the molecule, at least one glycidyl group and at least one unsaturated double bond,
   (a2) 1–30 parts by weight of styrene, and
   (a3) 10–79 parts by weight of an ethylenically unsaturated monomer having, in the molecule, neither carboxyl group nor tert-butyl ester group, the total of the monomers (a1), (a2) and (a3) being 100 parts by weight, (B) an aliphatic polycarboxylic acid, (C) a linear anhydride of an aliphatic polycarboxylic acid, and (D) a salt between a tertiary amine compound and an organic acid, and/or (E) a tertiary amine compound having a melting point of about 20°–150° C.

The thermosetting powder paint of the present invention is characterized by using, in combination, the components (A), (B) and (C) or the components (A), (B), (C), and (D) and/or (E) and also by using the component (A) of particular styrene content. By controlling each component of the paint or the composition of the paint, the paint can exhibit a high meritorious effect.

The thermosetting powder paint of the present invention has excellent storage stability and low-temperature curability and can form a coating film superior in mechanical properties and appearance.

[Constitution of the invention]

(1) Copolymer (A)

In the present invention, the copolymer (A) may be any of a random copolymer, an alternating copolymer, a block copolymer, a graft copolymer, etc. and may be any of linear, macrocyclic, branched, radial, three-dimensional reticulate and other copolymers.

In the present invention, the monomer (a1) having at least one glycidyl group and at least one unsaturated double bond, constituting the copolymer (A) is not particularly restricted as long as it is a compound having at least one glycidyl group and at least one unsaturated double bond.

Specific examples of the monomer (a1) include glycidyl acrylate, glycidyl methacrylate, β-methylglycidyl acrylate, β-methylglycidyl methacrylate, N-glycidylacrylamide, allyl glycidyl ether and glycidyl vinylsulfonate. Of these, glycidyl acrylate and glycidyl methacrylate are preferred. They can be used singly or in combination of two or more.

The amount of the monomer (a1) used in the copolymer (A) is preferably more than 20% by weight but not more than about 60% by weight, more preferably 25–50% by weight.

When the amount of the monomer (a1) used is more than 20% by weight, the coating film formed has a high crosslink density and superior properties in impact resistance, scratch resistance, solvent resistance, etc.

When the amount of the monomer (a1) used is not more than about 60% by weight, the coating film formed has good appearance (e.g. smoothness and sharpness).

The amount of the monomer (a2) (styrene) used in the copolymer (A) is preferably 1–30% by weight, more preferably 10–20% by weight.

The styrene component in the copolymer (A) contributes to the storage stability of paint and the gloss and smoothness of coating film.

When the amount of the styrene component is less than 1% by weight, the effect brought about by styrene tends to be reduced. When the amount is more than 30% by weight, the coating film formed tends to have yellowness, reduced yellowing resistance and reduced weathering resistance.

The ethylenically unsaturated monomer (a3) can be any compound as long as it has neither carboxyl group nor tert-butyl ester group in the molecule and has a radically-polymerizable unsaturated group. The monomer (a3) may be a single compound or a combination of two or more compounds. The monomer (a3) includes, for example, a carboxylic acid ester, an unsaturated hydrocarbon, a nitrile, an amide, etc. Of these, a carboxylic acid ester is preferred, and a (meth)acrylate of a primary or secondary alcohol is more preferred.

Specific examples of the monomer (a3) are acrylic acid derivatives such as methyl acrylate, ethyl acrylate, propyl acrylate, isopropyl acrylate, butyl acrylate, isobutyl acrylate, 2-ethylhexyl acrylate, dodecyl acrylate, stearyl acrylate, cyclohexyl acrylate, benzyl acrylate, phenyl acrylate, hydroxyethyl acrylate, hydroxypropyl acrylate, hydroxybutyl acrylate, 1,4-butanediol monoacrylate, dimethylaminoethyl acrylate and the like; methacrylic acid derivatives such as methyl methacrylate, ethyl methacrylate, propyl methacrylate, isopropyl methacrylate, butyl methacrylate, isobutyl methacrylate, 2-ethylhexyl methacrylate, dodecyl methacrylate, stearyl methacrylate, cyclohexyl methacrylate, benzyl methacrylate, phenyl methacrylate, hydroxyethyl methacrylate, hydroxypropyl methacrylate, hydroxybutyl methacrylate, 1,4-butanediol monomethacrylate, dimethylaminoethyl methacrylate and the like; vinyl esters such as vinyl acetate, vinyl propionate and the like; esters of dicarboxylic acids such as maleic acid, itaconic acid and the like; unsaturated hydrocarbons such as α-methylstyrene, vinyltoluene, tert-butylstyrene, vinylanisole, vinylnaphthalene, divinylbenzene, chlorostyrene and the like; nitriles such as acrylonitrile, methacrylonitrile and the like; amides such as acrylamide, methacrylamide, vinylamide, N-methylolacrylamide, N-methylolmethacrylamide, diacetoneacrylamide, diacetonemethacrylamide and the like; halogenated ethylenically unsaturated monomers such as vinyl chloride, vinylidene chloride, vinyl fluoride, monochlorotrifluoroethylene, tetrafluoroethylene, chloroprene and the like; olefins such as ethylene, propylene, isoprene, butadiene, α-olefins or dienes of 4–20 carbon atoms and the like; alkyl vinyl ethers such as lauryl vinyl ether and the like; and nitrogen-containing vinyls such as vinylpyrrolidone, 4-vinylpyrrolidone and the like. These compounds can be used singly or in combination of two or more.

The amount of the monomer (a3) used in the copolymer (A) is preferably 10–79% by weight, more preferably 10–70% by weight, most preferably 30–65% by weight.

It is not advisable to use, as the monomer (a3), a compound having one or more carboxyl groups, such as acrylic acid, methacrylic acid, maleic acid, itaconic acid or the like because, when such a compound is used, gelling may occur during synthesis of copolymer (A), or thermal decomposition of copolymer (A) may occur during solvent removal for copolymer recovery or during preparation of paint composition, or the coating film formed may have small lumps on the surface.

It is not advisable, either, to use tertbutyl (meth) acrylate as the monomer (a3) because the same problems as mentioned above may arise.

The copolymer (A) has a glass transition temperature (Tg) (calculated value) as obtained using the Fox formula, of preferably about 20°–100° C., more preferably about 30°–90° C., most preferably 50°–80° C. When said glass transition temperature of the copolymer (A) is lower than 20° C., the resulting paint composition tends to have inferior storage stability.

[Glass transition temperature (calculated value)-determination of glass transition temperature (Tg) of heteropolymer]

The glass transition temperature (Tg) of a polymer having a particular monomer composition can be determined by calculation using the Fox formula. With the Fox formula, the Tg of a copolymer composed of component monomers can be calculated from the Tg's of the respective homopolymers of said component monomers. This is described in Bulletin of the American Physical Society, Series 2, Vol. 1-No. 3, p. 123 (1956).

The Tg's of homopolymers of various ethylenically unsaturated monomers, used for determination of the Tg of a copolymer using the Fox's formula, are given in, for example, Table 10-2 (Main Raw Material Monomers for Acrylic Resin for Paint) appearing in Shin Kobunshi Bunko, Vol. 7 (Guide to Synthetic Resins for Paint), pp. 168–169, written by Kyozo Kitaoka and published from Kobunshi Kankokai, Kyoto, 1974.

The description is regarded as a matter or disclosure understood directly as one meaning by a person skilled in the art, by referring to the described in the specification of the present application.

There is no particular restriction for the process for synthesis of the copolymer (A) as long as a copolymer substantially having desired properties can be obtained.

The copolymer (A) can be synthesized by an ordinary process of conventional and wide use. It can be produced by solution polymerization, emulsion polymerization, suspension polymerization or radical polymerization including bulk polymerization. Solution polymerization is preferred particularly.

The molecular weight of the copolymer (A) can be controlled, for example, by conducting polymerization in the presence of (1) a chain transfer agent such as mercaptan (e.g. dodecylmercaptan), disulfide (e.g. dibenzoyl sulfide), alkyl ($C_{1-8}$) thioglycolate (e.g. 2-ethylhexyl thioglycolate), halogenated hydrocarbon (e.g. carbon tetrabromide) or the like and (2) an organic solvent having a high chain transfer effect, such as isopropyl alcohol, isopropylbenzene, toluene or the like.

The number-average molecular weight of the copolymer (A) is preferably about 1,000–30,000, more preferably about 2,000–20,000, most preferably about 2,500–6,000.

When the number-average molecular weight of the copolymer (A) is 1,000 or more, the resulting paint composition has good storage stability.

The number-average molecular weight of the copolymer (A) was measured by gel permeation chromatography using a polystyrene as a standard.

(2) Aliphatic polycarboxylic acid (B)

In the present invention, there is no particular restriction for the aliphatic polycarboxylic acid (B) long as it is substantially an aliphatic compound having at least two carboxyl groups in the molecule. It can be used as a single compound or in combination of two or more compounds.

Specific examples of the aliphatic polycarboxylic acid (B) are succinic acid, glutaric acid, adipic acid, pimelic acid, suberic acid, azelaic acid, sebacic acid, citric acid, maleic acid, citraconic acid, itaconic acid, gluconic acid, undecanedioic acid, dodecanedioic acid, pentadecanedioic acid, tridecanedioic acid, tetradecanedioic acid, hexadecanedioic acid, octadecanedioic acid, eicosanedioic acid, docosanedioic acid and tetradocosanedioic acid. Of these, dodecanedioic acid is preferred. They can be used singly or in combination of two or more.

In the present specification, the term "aliphatic" includes even "alicyclic" of low aromaticity. Therefore, there can be used, as the aliphatic polycarboxylic acid (B), even 1,4-cyclohexanedicarboxylic acid, 1,3-cyclohexanedicarboxylic acid, etc.

Use of an aromatic polycarboxylic acid as the component (B) is not advisable from the standpoint of the film properties obtained (e.g. smoothness, impact resistance and weathering resistance).

The polycarboxylic acid (B) is used in such an amount that the amount of the carboxyl group in (B) becomes preferably about 0.1–1.2 equivalents, more preferably about 0.3–0.8 equivalent per equivalent of the glycidyl group in the copolymer (A).

When the amount of the polycarboxylic acid used is in the above range, the resulting paint has good storage stability and the coating film formed therewith has good solvent resistance and impact resistance.

Further, the component (B) is used in such an amount that the ratio of the total equivalent of the carboxyl group in (B) and the acid anhydride group in (C), to the equivalent of the glycidyl group in (A) becomes generally about 0.5:1 to about 1:0.5. (3) Linear anhydride (C) of aliphatic polycarboxylic acid It is at least one linear anhydride of an aliphatic polycarboxylic acid, selected from the group consisting of linear anhydrides of aliphatic polycarboxylic acids.

In the present invention, there is no particular restriction for the linear anhydride (C) of an aliphatic polycarboxylic acid as long as it is substantially a linear aliphatic dimeric or polymeric anhydride having, in the molecule, carboxyl group and/or anhydride group in total two or more groups. The component (C) can be used as a single compound or in combination of two or more compounds.

The component (C) is generally a linear anhydride of a polycarboxylic acid and/or a linear anhydride of an aliphatic dicarboxylic acid represented by the following general formula:

HO—[OC(CH$_2$)$_m$COO]$_n$—H wherein m is a natural number of 1 or larger but not larger than about 25, preferably not larger than 20; and n is a natural number of 2 or larger but preferably not larger than about 40, more preferably not larger than 30.

Preferable specific examples of the linear anhydride of a polycarboxylic acid are linear dehydration-condensation products of adipic acid, pimelic acid, suberic acid, azelaic acid, sebacic acid, undecanedioic acid, dodecanedioic acid, eicosanedioic acid and octadecanedioic acid. A linear dehydration condensation product of dodecanedioic acid is most preferred.

In the present specification, the term "linear" includes not only "linear" but also a case in which a linear aliphatic dimeric or polymeric anhydride forms a macrocyclic ring. There can also be used a linear copolycondensation product of two or more aliphatic polycarboxylic acids.

Use of a cyclic anhydride of a polycarboxylic acid, such as succinic anhydride or phthalic anhydride is not advisable because when said cyclic anhydride is reacted with the copolymer (A), said cyclic anhydride tends to react only with the epoxy ring(s) of particular glycidyl group(s) in the copolymer (A) and accordingly shows no sufficient effect for crosslinking a plurality of copolymer (A) molecules.

The definitions of the term "anhydride", "anhydride group", "anhydride bond" and "polyanhydride" used in the present specification include even those of respective terms appearing in the "polyanhydride" section of Kobunshi Daijiten published from Maruzen in 1994.

Polyanhydrides were energetically studied by MIT researchers in early 1980's when the research and development on biodegradable bio (medical) polymer materials and their application to drug delivery system were active, and came to draw attention.

Linear aliphatic dimeric or polymeric anhydrides can be synthesized, for example, by melt polycondensation, solution polycondensation or interfacial polycondensation.

The linear anhydride (C) of an aliphatic polycarboxylic acid is preferably produced so as to have a melting point of about 40°-150° C.

When the melting point of the linear anhydride (C) is lower than about 40° C., the resulting paint tends to have lower storage stability.

When the melting point of the linear anhydride (C) is higher than about 150° C., the resulting paint tends to have lower fluidity when heated and the coating film formed therewith tends to have inferior appearance (e.g. lower smoothness).

The linear anhydride (C) of an aliphatic polycarboxylic acid is used in such an amount that the amount of the acid anhydride group in (C) becomes preferably about 0.1-1.2 equivalents, more preferably about 0.2-0.6 equivalent per equivalent of the glycidyl group in the copolymer (A).

When the amount of the linear anhydride (C) used is in the above range, the coating film formed has low popping, less pinholes, good appearance, excellent solvent resistance, excellent impact resistance and excellent weathering resistance.

Further, the component (B) is used in such an amount that the total amount of the carboxyl group in (B) and the acid anhydride group in (C) becomes preferably about 0.5-2 equivalents, more preferably about 0.7-1.2 equivalents per equivalent of the glycidyl group in (A).

The powder paint of the present invention comprising the aliphatic polycarboxylic acid (B) and the linear anhydride (C) of an aliphatic polycarboxylic acid, as compared with a powder paint which is the present paint less the component (C) [the component (B) is present] or with a powder paint which is the present paint less the component (B) [the component (C) is present], gives a coating film of excellent mechanical properties and appearance, owing to the synergistic effect of the components (B) and (C).

The present powder paint, as compared with a powder paint which is the present paint less the component (C) [the component (B) is present], has higher low-temperature curability; and the coating film formed therewith has higher scratch resistance, chipping resistance, solvent resistance, acid resistance, smoothness and sharpness.

The present powder paint, as compared with a powder paint which is the present paint less the component (B) [the component (C) is present], has higher storage stability; and the coating film formed therewith has higher yellowing resistance and impact resistance, generates neither popping nor pinhole, and has excellent sharpness.

It is presumed that the aliphatic polycarboxylic acid (B) contributes mainly to the improvement of paint in storage stability and to the improvement of coating film in impact resistance, yellowing resistance and popping/pinhole prevention and that the linear anhydride (C) of an aliphatic polycarboxylic acid contributes mainly to the improvement of paint in low-temperature curability and to the improvement of coating film in solvent resistance, scratch resistance, acid resistance, chipping resistance and smoothness.

Preferably, the linear anhydride (C) of an aliphatic polycarboxylic acid is a linear anhydride obtained by dehydration and condensation of the aliphatic polycarboxylic acid (B). More preferably, the component (B) is dodecanedioic acid and the component (C) is a linear anhydride of dodecanedioic acid.

(4) Slat (D) between tertiary amine compound and organic acid

The salt (D) between tertiary amine compound and organic acid when used together with the components (A), (B) and (C) has no problem in storage stability and, as compared with the paint using no component (D), can employ curing conditions of lower temperature and shorter time to form a cured coating film of good properties.

The component (D) can be at least one salt between an organic acid and a known tertiary amine compound capable of promoting curing, generally used in paint technology field.

Examples of the component (D) are salts between DBU (1,8-diazabicyclo[5.4.0]-7-undecene) and organic acid, such as DBU-octylic acid salt, DBU-formic acid salt, DBU-carbonic acid salt, DBU-adipic acid salt, DBU-o-phthalic acid salt, DBU-phthalic acid salt, DBU-phenolic acid salt, DBU-oleic acid salt, DBU-p-toluenesulfonic acid salt, DBU-phenolic novolac salt, DBU-2-ethylhexanoic acid salt and the like (all of these products are products of San-Apro Ltd.). The component (D) is not restricted to these examples.

The amount of the component (D) used is preferably 3 parts by weight or less, more preferably about 0.01-3 parts by weight per 100 parts by weight of the total of the components (A), (B) and (C).

When the amount of the component (D) used is parts by weight or less, the resulting paint composition has good storage stability and is cured at an appropriate rate, and the coating film formed therewith has good smoothness.

(5) Tertiary amine compound (E) having a melting point of about 20°-150° C.

The component (E) when used together with the components (A), (B) and (C) has no problem in storage stability and, as compared with the paint using no component (E), can employ curing conditions of lower temperature and shorter time to form a cured coating film of good properties.

The component (E) can be at least one known tertiary amine compound capable of promoting curing, generally used in paint technology field. The tertiary amine compound, however, must have a melting point of about 20°–150° C.

Examples of such a compound are tertiary amine compounds such as tribenzylamine (a product of KOEI CHEMICAL COMPANY LIMITED), Wondamine 3TD-TA, Wondamine 88-TA and Wondamine 3F-TA (these are products of New Japan Chemical Co., Ltd.) and the like; and compounds having a structure of N-methyl-N,N-dialkylamine (the alkyl has 2 to about 30 carbon atoms), such as ARMEEN M2HT (a product of Lion Akzo Corporation). Of these, ARMEEN M2HT is preferred. The component (E) is not restricted thereto.

The amount of the component (E) used is preferably about 3 parts by weight or less, more preferably about 0.01–3 parts by weight per 100 parts by weight of the total of the components (A), (B) and (C).

When the amount of the component (E) used is 3 parts by weight or less, the resulting paint composition has good storage stability and an appropriate curing rate, and the coating film formed therewith has good smoothness.

The paint containing the component (E) is characterized by having good storage stability even under high humidities (e.g. R.H.=80% or more).

Other curing agents such as quaternary ammonium salt, phosphonium salt, phosphine, imidazole, melamine and the like are not preferred because they give a paint significantly inferior in storage stability and a coating film significantly inferior in coloring and appearance (e.g. smoothness).

[Additives]

To the paint of the present invention are added various additives ordinarily used in paints.

To the thermosetting powder paint of the present invention can be added, as necessary, for improvement of coating film in appearance or properties, a synthetic resin composition containing an epoxy resin, a polyester resin, a polyamide or the like, or a natural resin or semi-synthetic resin composition containing a cellulose, a cellulose derivative or the like.

To the thermosetting powder paint of the present invention can also be added, as necessary, additives such as pigment, flow control agent, thixotropy control agent, antistatic agent, surface control agent, luster improver, antiblocking agent, plasticizer, ultraviolet absorber, antipopping agent, antioxidant and the like.

Specific examples of the antiblocking agent suitably used in the thermosetting powder paint of the present invention are aliphatic amides such as acetamide, propionamide, stearamide, cerotamide and the like; bis(aliphatic acid) amides such as diacetamide, bis(oleic acid) amide, bis(lauric acid) amide, methylene bis(stearo)amide, ethylene bis(stearo)amide and the like; higher fatty acid esters such as myricyl cerotate, butylene glycol dimontanate, glycerine tri-1,2-hydroxystearate and the like; a polyethylene, an atactic polypropylene or a partial oxidation product thereof. The antiblocking agent is not restricted thereto.

The antiblocking agent is used in an amount of generally about 10 parts by weight or less per 100 parts by weight of the thermosetting powder paint of the present invention.

Specific examples of the surface control agent suitably used in the thermosetting powder paint of the present invention are homo- or cooligomers of (meth)acrylic acid ester monomer or styrene monomer; metal salts of perfluorocarboxylic acid or perfluorosulfonic acid; and esters between polyethylene glycol or polypropylene glycol and perfluorocarboxylic acid. The surface control agent is not restricted thereto.

The surface control agent is added in an amount of generally about 5 parts by weight or less per 100 parts by weight of the thermosetting powder paint of the present invention.

Specific examples of the pigment suitably used in the present thermosetting powder paint to endow said paint with a desired color, are inorganic pigments such as titanium oxide, iron oxide, chromium oxide, carbon black and the like; and organic pigments such as Phthalocyanine Blue, Phthalocyanine Green, Cinquacia Red and the like. The pigment is not restricted thereto.

Specific examples of the plasticizer suitably used in the present thermosetting powder paint are an adipic acid ester, a phosphoric acid ester, a phthalic acid ester, a sebacic acid ester, a polyester obtained from adipic acid or azelaic acid, and an epoxidized plasticizer. The plasticizer is not restricted thereto.

When the present thermosetting powder paint is used as a clear coat, a pigment may be added to the paint in such an amount that the pigment does not show its hiding power completely but its color is exhibited.

[Kneading of powder paint composition]

In mechanically kneading the components (A), (B) and (C), or (A), (B), (C) and (D) and/or (E), there is no particular restriction as to the kneading temperature as long as a substantially uniform powder paint composition can be prepared.

As the melt kneader, there are generally used a heated roll, a heated kneader, an extruder, etc.

The present thermosetting powder paint composition can be produced, for example, as follows. There are appropriately combined a kneader(s) and a mixer(s), such as roll, kneader, mixer (e.g. Banbury or transfer type), calender, extruder and the like; the conditions used in said kneader(s) and mixer(s), such as temperature, melting or non-melting, rpm, degree of vacuum, kind of inert gas atmosphere and the like are appropriately determined; then, mixing is conducted thoroughly and uniformly; thereafter, grinding is conducted by the use of a grinder to obtain a thermosetting powder paint composition of uniform fine powder state. The present paint composition can also be produced by other methods.

There is described an example of the operation for compounding additives, etc. into the present thermosetting powder paint composition. To the present thermosetting powder paint composition are added, as necessary, additives such as antiblocking agent, surface control agent, plasticizer, antistatic agent, pigment, filler, extender and the like; the mixture is melt-kneaded thoroughly at about 40°–130° C. and then cooled; the resulting material is uniformly ground into appropriate particle sizes (generally about 100 mesh or less) to obtain a desired thermosetting powder paint composition.

[Coating method and curing method]

The above-obtained powder paint is adhered to a material to be coated and then heat-cured to form a coating film.

The coating of the thermosetting powder paint composition of the present invention can be conducted, for example, by electrostatic coating or fluidized bed coating.

When the present thermosetting powder paint composition is coated as a top coat on a basecoat of solvent type or aqueous type, the resulting coating film exhibits excellent properties similarly to the coating film of solvent type paint.

That is, an aqueous basecoat is coated and dried for a given length of time; thereafter, the thermosetting powder paint composition of the present invention is adhered onto the aqueous basecoat by the above-mentioned method and heat-cured, whereby a coating film is formed.

Generally, the heat-curing of the coated paint is conducted preferably at about 100°–180° C., more preferably at 130°–160° C. for about 10–60 minutes, whereby a crosslinking reaction between the copolymer (A), the curing agent (B) and the curing agent (C) is allowed to take place. The cured coated paint is cooled to room temperature, whereby a coating film having excellent properties can be obtained.

[Mechanism of curing of coated powder paint composition for formation of coating film]

The thermosetting powder paint composition of the present invention is uniformly coated on a substrate (a sublayer, a base material or a material to be coated) and then heated, whereby a curing reaction (a crosslinking reaction) is allowed to take place.

This curing reaction is presumed to proceed as follows.

That is, the glycidyl group in the copolymer (A) and the carboxyl group in the aliphatic polycarboxylic acid (B) react with each other to form a secondary hydroxyl group; and the linear anhydride (C) of aliphatic polycarboxylic acid, which has undergone scission, adds to said secondary hydroxyl group to give rise to a secondary reaction.

When the salt (D) between tertiary amine compound and organic acid and/or the tertiary amine compound (E) having a melting point of about 20°–150° C. coexists, the glycidyl group in the copolymer (A) and the carboxyl group in the aliphatic polycarboxylic acid (B) are reacted with each other by the catalytic action of (D) and/or (E) to form a secondary hydroxyl group; and the linear anhydride (C) of aliphatic polycarboxylic acid, which has undergone scission owing to the action of (D) and/or (E), adds to said secondary hydroxyl group to give rise to a secondary reaction.

In addition to the above curing reactions, the linear anhydride (C) of aliphatic polycarboxylic acid gives rise to various curing reactions such as the following in the presence of (D) and/or (E).

A reaction between the terminal carboxyl group in (C) and the glycidyl group in (A)

A reaction between the acid anhydride group in (C) and the glycidyl group in (A)

A reaction between the acid anhydride group in (C) and the secondary hydroxyl group formed by a reaction between the carboxyl group in (C) or (B) and the glycidyl group in (A)

Thus, the present thermosetting powder paint composition, as compared with conventional powder paints containing glycidyl group and carboxyl group alone, or glycidyl group and acid anhydride group alone, can form a coating film of higher crosslink density, capable of showing desired properties depending upon the curing degree of said film.

[Definition of term "derivative"]

The definition of the term "derivative" used in the claims and specification of the present application includes a compound in which the hydrogen atom(s) of a particular compound is (are) substituted with other atom(s) or atomic group(s) R.

In the above, R is a monovalent hydrocarbon group having at least one carbon atom. Specifically, R is an aliphatic group, an alicyclic group of low aromaticity, or a group which is a combination of said aliphatic group and said alicyclic group. Said group may be a group to which hydroxyl group, carboxyl group, amino group, nitrogen atom, sulfur atom, silicon atom, phosphorus atom or the like can be bonded. Of these, R is preferably an aliphatic group of a narrow sense.

The above-mentioned group of R may have substituent(s) such as hydroxyl group, alkyl group, cycloalkyl group, aryl group, alkoxyl group, cycloalkoxyl group, aryloxyl group, halogen group (e.g. F, Cl or Br) and/or the like.

By appropriately selecting R, the resulting powder paint composition of the present invention can give a coating film of desired properties.

With respect to the evaluation of the present thermosetting powder paint, description is made below on the definition of chipping resistance, the definition of impact resistance, and the correlation of these two properties. Incidentally, the test methods for various properties of the present powder paint are shown in Examples which appear later.

[Definition of "chipping resistance"]

The definition of "chipping" used in the claims and specification of the present application includes a phenomenon of impact fracture which a coating film undergoes when a load is applied onto a pin-point area of said coating film for a short time. In the technological field of automobile paint, in particular, said definition includes even a phenomenon of damage which the coating film formed on automobile body undergoes when small flying stones hit the film.

The definition of the term "chipping resistance" used in the claims and specification of the present application includes the resistance of coating film to "chipping".

[Definition of "impact resistance"]

The definition of "impact" used in the claims and specification of the present application includes a phenomenon of impact fracture which a coating film undergoes when a load is applied onto a wide area of said coating film for a short time. In the technological field of automobile paint, in particular, said definition includes even a phenomenon of damage which the coating film formed on automobile body undergoes when the automobile body hits a large object.

The definition of the term "impact resistance" used in the claims and specification of the present application includes the resistance of coating film to "impact".

[Correlation of impact resistance and chipping resistance]

Among those skilled in the art, there has hitherto been substantially no knowledge as to the difference between the definition of impact resistance of coating film and the definition of chipping resistance of coating film. Further, while the impact resistance of coating film has been regarded as important, nearly no attention has been paid to the importance of the chipping resistance of coating film.

That is, the impact resistance of coating film was measured but the chipping resistance of coating film was not always measured.

Since there has been substantially no knowledge as to the difference between the definition of impact resistance and the definition of chipping resistance, nearly no study has been made on the correlation between impact resistance and chipping resistance.

Japanese Patent Application Kokai (Laid-Open) No. 221567/1991, for example, discloses a technique in which a coated powder paint film is cured by an acid/isocyanate reaction to obtain a coating film of improved impact resistance.

Even in this literature, the chipping resistance of coating film is not conceived at all, and attention is paid only to the importance of the impact resistance of coating film and no attention is paid at all to the importance of the chipping resistance of coating film.

Under the above situation, the present inventors paid attention to the correlation between impact resistance and chipping resistance, of a coating film formed with a powder paint.

As a result of a study made on the correlations between impact resistance and chipping resistance, of various coating films, the present inventors found out that the impact resistance and the chipping resistance do not necessarily correlate with each other.

Hence, the present inventors thought that the impact resistance and chipping resistance of a coating film do not always appear from the same action mechanism and accordingly may show different effects.

[EXAMPLES]

The following Production Examples, Examples and Comparative Examples are to help understand the present invention in more detail and do not restrict the present invention.

In the following, "parts" and "%" are by weight unless otherwise specified.

The results of Production Examples, Examples and Comparative Examples are shown in Tables. The abbreviations used in these Tables refer to the following compounds or material.

and a nitrogen inlet tube. The mixture was heated to its refluxing temperature with stirring. Then, thereto were dropwise added, in 5 hours, the monomers shown in Table 1 and tert-butyl peroxy-2-ethylhexanoate (Perbutyl O, a product of Nippon Oils and Fats Co., Ltd.) as a polymerization initiator. The mixture was kept for 1 hour. Thereto was dropwise added 0.5 part of Perbutyl O at 100° C., and the mixture was kept for 2 hours. The resulting reaction mixture was subjected to solvent removal to obtain copolymers (A).

The copolymers (A) were measured for properties by the following methods.

(1) Glass transition temperature (Tg)

Determined by using the monomer composition employed and the Fox formula.

(2) Number-average molecular weight

Measured by GPC using a polystyrene as a standard.

By changing the kinds and proportions of monomers, various copolymers (A) shown in Table 1 were produced.

TABLE 1

| | copolymers (A) | | | | | | | | | |
|---|---|---|---|---|---|---|---|---|---|---|
| | A-1 | A-2 | A-3 | A-4 | A-5 | A-6 | A-7 | A-8 | A-9 | A-10 |
| ST | 10.0 | 20.0 | 20.0 | 0 | 45.0 | 10.0 | 10.0 | 5.0 | 20.0 | 25.0 |
| MMA | 39.3 | 27.6 | 7.4 | 43.5 | 10.6 | 0 | 25.0 | 42.2 | 18.6 | 30.8 |
| nBMA | 10.7 | 22.4 | 0 | 16.5 | 4.4 | 0 | 0 | 22.8 | 6.4 | 14.2 |
| iBMA | 0 | 0 | 22.6 | 0 | 0 | 75.0 | 0 | 0 | 0 | 0 |
| GMA | 40.0 | 30.0 | 50.0 | 40.0 | 40.0 | 15.0 | 65.0 | 30.0 | 55.0 | 30.0 |
| nBA | 0 | 0 | 0 | 0 | 0 | 0 | 0 | 0 | 0 | 0 |
| BB-O | 4.0 | 3.7 | 4.0 | 3.5 | 4.2 | 3.8 | 3.2 | 4.0 | 3.7 | 4.0 |
| Tg | 70 | 65 | 65 | 65 | 75 | 65 | 50 | 65 | 65 | 65 |
| Mn | 3200 | 3500 | 2800 | 2800 | 3800 | 2500 | 3000 | 2900 | 2800 | 3500 |

ST: styrene
MMA: methyl methacrylate
nBMA: n-butyl methacrylate
iBMA: isobutyl methacrylate
GMA: glycidyl methacrylate
nBA: n-butyl acrylate
PB-O: tert-butyl peroxy-2-ethylhexanoate
DDA: dodecanedioic acid
DDA-Ah: linear anhydride of dodecanedioic acid
SBA: sebacic acid
SBA-Ah: linear anhydride of sebacic acid
TPA-Ah: linear anhydride of terephthalic acid
DBU: 1,8-diazabicyclo[5.4.0]-7-undecene
DBU-Fa: DBU-formic acid salt
DBU-Oa: DBU-oleic acid salt
PA-Ah: phthalic anhydride
TPA: terephthalic acid
TBA: tribenzylamine
TEA: triethylamine
TPP: triphenylphosphine
M2HT: ARMEEN M2HT (a product of Lion Akzo Corporation)

Production Example 1

Production of copolymers (A)

66.7 parts of xylene was fed into a four-necked flask equipped with a stirrer, a thermometer, a reflux condenser Production Example 2

Production of linear anhydrides (C) of aliphatic polycarboxylic acids 1 mole of dodecanedioic acid and 1.1 moles of acetic anhydride were fed into a reactor. The mixture was heated to 150° C. and subjected to a reaction for 5 hours while the formed acetic acid was being removed from a vacuum line so that acetic anhydride did not disappear out of the system. Immediately, the system was cooled and a white solid was recovered. The solid (a linear anhydride of dodecanedioic acid) had a melting point of 73°–82° C.

Also, a linear anhydride of sebacic acid having a melting point of 72°–81° C. was obtained in the same manner.

Other linear anhydrides were also obtained in the same manner.

All the powder paints obtained in the following Examples and Comparative Examples were measured for the following five common property items by the following methods. Other property items were also measured but these items and the test methods therefor are shown in respective Examples and Comparative Examples.

(1) Appearance (visual)

A coating film was observed for appearance, and its smoothness and sharpness were rated.

(2) Gloss

Measured using a gloss meter and expressed as a 60° gloss value.

(3) Impact resistance by Du Pont type test

Measured in accordance with JIS K 5400 6.13.3, using a 1-kg weight, and expressed as a height (a falling distance) of the weight at which cracking or peeling of coating film occurred.

(4) Adhesivity

Measured by the use of an Erichsen tester, and expressed as a degree (mm) of peeling when peeling of coating film occurred.

(5) Solvent resistance

The surface of a coating film was rubbed each 50 times forward and backward with a gauze impregnated with xylol, and then examined for scar formation. The rating was made based on the following criterion.

⦿: No scar is seen.
○: Slight scar is seen.
X: Distinct scar is seen.

Examples 1–7 and Comparative Examples 1–10

[Preparation (1) of powder paints]

There were compounded, in the proportions shown in Table 2, one of the copolymers (A) produced in Production Example 1, an aliphatic polycarboxylic acid (B), one of the linear anhydrides (C) of aliphatic polycarboxylic acids produced in Production Example 2, and, as necessary, a salt (D) between tertiary amine compound and organic acid. Thereto were added 1 part by weight of Resimix RL-4 (a low-viscosity acrylic acid as a flow control agent, a product of Mitsui Toatsu Chemicals, Inc.), 1 part by weight of Tinuvin 144 (a photostabilizer, a product of Ciba-Geigy Corp.), 1 part by weight of benzoin (an anti-popping agent) and 2 parts by weight of Tinuvin 900 (an ultraviolet light absorber, a product of Ciba-Geigy Corp.) [all of said amounts are per 100 parts by weight of the total of (A), (B) and (C)]. The resulting mixture was melt-kneaded at 90° C. by the use of a heated roll, then cooled, and finely ground by the use of a grinder to recover the portion which had passed through a screen of 150 mesh, whereby various powder coatings were prepared.

These powder coatings were coated by electrostatic coating and cured to evaluate the powder coatings, as described below. The results are shown in Table 2 (Examples) and Table 3 (Comparative Examples) appearing later.

[Preparation of test plates by coating and curing (1)]

Each of the powder paints prepared above was coated on a steel plate by electrostatic coating so as to give a coating film of 60–70μ in thickness, and cured at 140° C. for 30 minutes to prepare various test plates.

[Performance evaluation]

Each powder paint was subjected to performance evaluation for the common property items by the test methods described previously and also for the following other property items by the following test methods.

(1) Appearance (visual)

A coating film was observed for appearance, and its smoothness and sharpness were rated by the following criterion.

⦿: Smoothness and sharpness are excellent.

○: Slight unevenness (smoothness) and slight cloudiness (sharpness).

X: Smoothness and sharpness are inferior.

(2) Scratch resistance

A melamine-crosslinked polyester black paint was coated on a 0.8-mm thick steel plate treated with zinc phosphate, in a film thickness of 30μ, followed by curing to prepare a surface-treated steel plate.

On this surface-treated steel plate was coated, by electrostatic coating, a powder paint composition so as to give a coating film of 60–70μ in thickness, followed by curing at 140° C. for 30 minutes to obtain a test plate.

The surface of the coating film of the test plate was rubbed with a brush using a 0.3% cleanser suspension, and the gloss of the surface was measured before and after the rubbing to calculate a gloss retention (%).

The scratch resistance of the coating film was rated based on the level of gloss retention (%), according to the following criterion.

○: The coating film has a gloss retention of more than 60% and has sufficient scratch resistance.

Δ: The coating film has a gloss retention of 40–60% and has insufficient scratch resistance.

X: The coating film has a gloss retention of less than 40% and has inferior scratch resistance.

(3) Weathering resistance

A coating film was subjected to a 3000-hour acceleration test by a QUV tester, and the gloss (60°) of the coating film was measured before and after the test to calculate a gloss retention (%).

The weathering resistance of the coating film was rated based on the level of gloss retention (%) according to the following criterion.

⦿: The coating film has a gloss retention of more than 80%.

○: The coating film has a gloss retention of 70–80%.

X: The coating film has a gloss retention of less than 70%.

(4) Acid resistance 40 volume % of sulfuric acid was dropped on a coating film, followed by standing at 60° C. for 20 minutes. The resulting coating film was washed with water and observed for appearance. The acid resistance of the coating film was rated according to the following criterion.

○: No corrosion of coating film

Δ: Slight corrosion of coating film

X: Distinct corrosion of coating film (5) Storage stability

A powder paint composition was stored at 40° C. for 3 days and then made into pellets of 10 mm (diameter) and 0.3 g. The pellets were adhered onto a plate, and the resulting plate was kept vertically and subjected to curing at 140° C. for 30 minutes to measure the sagging of the pellets.

⦿: Good flowing
X: inferior flowing

TABLE 2

Results

| | Co-polymer (A) | Poly-carboxylic acid (B) | Linear anhydride (C) | Amine salt (D) | Smoothness | Sharpness | Gloss | Impact resistance | Adhesivity | Solvent resistance | Acid resistance | Scratch resistance | Weathering resistance | Storage stability |
|---|---|---|---|---|---|---|---|---|---|---|---|---|---|---|
| | Parts by weight | | | | | | | | | | | | | |
| Example 1 | A-1 75.5 | DDA 12.2 | DDA-Ah 12.3 | DBU-Fa 1.0 | ⊚ | ⊚ | 145 | 35 | 8< | ⊚ | ○ | ○ | ⊚ | ⊚ |
| Example 2 | A-2 80.4 | DDA 9.8 | DDA-Ah 9.8 | DBU-Fa 1.0 | ⊚ | ⊚ | 150 | 35 | 8< | ⊚ | ○ | ○ | ⊚ | ⊚ |
| Example 3 | A-1 71.1 | DDA 14.4 | DDA-Ah 14.5 | DBU-Fa 1.0 | ⊚ | ⊚ | 140 | 40 | 8< | ⊚ | ○ | ○ | ⊚ | ⊚ |
| Example 4 | A-1 75.5 | DDA 12.2 | DDA-Ah 12.3 | DBU-Oa 1.0 | ⊚ | ⊚ | 140 | 35 | 8< | ⊚ | ○ | ○ | ⊚ | ⊚ |
| Example 5 | A-8 80.4 | DDA 9.8 | DDA-Ah 9.8 | DBU-Fa 1.0 | ○ | ⊚ | 135 | 35 | 8< | ⊚ | ○ | ○ | ⊚ | ⊚ |
| Example 6 | A-9 70.3 | DDA 15.8 | DDA-Ah 13.9 | DBU-Fa 1.0 | ○ | ○ | 130 | 35 | 8< | ⊚ | ○ | ○ | ⊚ | ⊚ |
| Example 7 | A-10 80.4 | DDA 9.8 | DDA-Ah 9.8 | DBU-Fa 1.0 | ⊚ | ⊚ | 155 | 35 | 8< | ⊚ | ○ | ○ | ⊚ | ⊚ |
| Example 8 | A-1 80.4 | DDA 12.2 | DDA-Ah 12.3 | | ⊚ | ⊚ | 145 | 30 | 8< | ○ | ○ | ○ | ○ | ⊚ |

TABLE 3

Results

| | Co-polymer (A) | Poly-carboxylic acid (B) | Linear anhydride (C) | Amine salt (D) | Smoothness | Sharpness | Gloss | Impact resistance | Adhesivity | Solvent resistance | Acid resistance | Scratch resistance | Weathering resistance | Storage stability |
|---|---|---|---|---|---|---|---|---|---|---|---|---|---|---|
| | Parts by weight | | | | | | | | | | | | | |
| Comparative Example 1 | A-4 75.5 | DDA 12.2 | DDA-Ah 12.3 | DBU-Fa 1.0 | ○ | ○ | 120 | 35 | 8< | ⊚ | ○ | ○ | ○ | x |
| Comparative Example 2 | A-5 75.5 | DDA 12.2 | DDA-Ah 12.3 | DBU-Fa 1.0 | ⊚ | ⊚ | 140 | 35 | 8< | ⊚ | ○ | ○ | x | ⊚ |
| Comparative Example 3 | A-6 85.3 | DDA 5.2 | DDA-Ah 6.5 | DBU-Fa 0.9 | ⊚ | ⊚ | 150 | 15> | 2 | x | x | x | x | ⊚ |
| Comparative Example 4 | A-7 59.1 | DDA 14.4 | DDA-Ah 18.0 | DBU-Fa 0.9 | x | x | 60 | 20 | 5 | ○ | ○ | △ | ○ | x |
| Comparative Example 5 | A-1 75.5 | DDA 24.5 | | DBU-Fa 1.0 | ○ | ○ | 110 | 20 | 6 | ○ | x | x | ○ | ⊚ |
| Comparative Example 6 | A-1 67.6 | | DDA-Ah 32.4 | DBU-Fa 1.0 | ⊚ | ○ | 140 | 15> | 4 | x | △ | △ | x | x |
| Comparative Example 7 | A-1 71.6 | TPA 16.7 | DDA-Ah 11.7 | DBU-Fa 1.0 | x | x | 40 | 15> | 1> | x | x | x | x | ⊚ |
| Comparative Example 8 | A-1 77.8 | DDA 12.6 | TPA-Ah 9.6 | DBU-Fa 1.0 | x | x | 60 | 15> | 1> | x | x | x | x | ⊚ |
| Comparative Example 9 | A-1 77.7 | DDA 12.6 | PA-Ah 9.7 | DBU-Fa 1.0 | x | x | 70 | 15 | 2 | x | x | x | x | ⊚ |
| Comparative Example 10 | A-5 75.5 | DDA 12.2 | DDA-Ah 12.3 | DBU 1.0 | x | x | 110 | 15> | 4 | ○ | ○ | ○ | ○ | x |

In Table 2, the powder paints of Examples 1–7 fall in the scope of claims of the present invention but differ in the amount of glycidyl group in copolymer, the styrene content in copolymer, the proportions of functional groups of resin and curing agent during production of powder paint, the kind of curing agent, and the kind of curing catalyst. These paints have excellent storage stability and give a coating film of excellent properties and appearance.

Comparative Example 1 is an example using a copolymer containing no styrene, and the paint had inferior storage stability. Comparative Example 2 is an example using a copolymer containing styrene in excess, and the paint gave a coating film of inferior weathering resistance.

Comparative Examples 3 and 4 are each an example using a copolymer containing glycidyl group in an amount not falling in the range specified by the present invention. When the amount of glycidyl group was too small (Comparative Example 3), the paint gave a coating film inferior in properties including weathering resistance. When the amount of glycidyl group was too large (Comparative Example 4), the paint had inferior storage stability and gave a coating film of inferior appearance.

Comparative Examples 5 and 6 are each an example not using, as a curing agent, a combination of an aliphatic polycarboxylic acid and a linear anhydride of an aliphatic polycarboxylic acid, in production of powder paint. When only an aliphatic polycarboxylic acid was used (Comparative Example 5), the paint gave a coating film of inferior appearance and properties. When only a linear anhydride of an aliphatic polycarboxylic acid was used (Comparative Example 6), the paint had inferior storage stability and gave a coating film of inferior properties and weathering resistance.

Comparative Examples 7–8 are each an example using an aromatic compound as a curing agent. The respective paints were inferior in properties of coating film. Comparative Example 9 is an example using a phthalic anhydride (a cyclic acid anhydride). Since only the glycidyl group in (A) took part in a reaction and crosslinking occurred insufficiently, the coating film obtained had inferior properties. Comparative Example 10 is an example using a liquid tertiary amine compound, and the paint showed inferior storage stability.

Example 8

A powder paint was prepared in the same manner as in Examples 1–7, using no amine salt [no component (D)]; the paint was coated and cured in the following manner to prepare a test plate; the paint and the test plate were evaluated in the same manner as in Examples 1–7. The results are shown in Table 2. Since the curing was conducted at 160° C., the paint showed satisfactory performance.

[Preparation of test plate by coating and curing (2)]

The powder paint obtained above using the copolymer (A-1) was coated on a steel plate by electrostatic coating so as to give a coating film of 60–70 μ in thickness, followed by curing at 160° C. for 30 minutes to prepare a test plate.

Examples 9–19 and Comparative Examples 11–18

[Preparation (2) of powder coatings]

There were compounded, in the proportions shown in Tables 4 and 5, one of the copolymers (A) produced in Production Example 1, an aliphatic polycarboxylic acid (B), one of the linear anhydrides (C) of aliphatic polycarboxylic acids produced in Production Example 2, and, as necessary, a tertiary amine compound (E) having a melting point of about 20°–150° C. Thereto were added 1 part by weight of Resimix RL-4 (a low-viscosity acrylic acid as a flow control agent, a product of Mitsui Toatsu Chemicals, Inc.), 1 part by weight of Tinuvin 144 (a photostabilizer, a product of Ciba-Geigy Corp.), 1 part by weight of benzoin (an anti-popping agent) and 2 parts by weight of Tinuvin 900 (an ultraviolet light absorber, a product of Ciba-Geigy Corp.) [all of said amounts are per 100 parts by weight of the total of (A), (B) and (C)]. The resulting mixture was melt-kneaded at 90° C. by the use of a heated roll, then cooled, and finely ground by the use of a grinder to recover the portion which had passed through a screen of 150 mesh, whereby various powder coatings were prepared.

[Preparation of test plates by coating and curing (3)]

On a Satin-finish steel plate of 0.8 mm in thickness, treated with zinc phosphate was coated a melamine-crosslinked polyester black paint in a film thickness of 30μ, followed by curing to prepare surface-treated steel plates.

Each of the powder paints obtained above was coated, by electrostatic coating, on one of the above-prepared surface-treated steel plates in a film thickness of 60–70μ, followed by curing at 140° C. for 30 minutes to obtain various test plates.

[Performance evaluation]

Each powder paint was subjected to performance evaluation for the five common property items by the test methods described previously and also for the following other property items by the following test methods.

(1) Appearance (visual)

A coating film was observed for appearance, and its smoothness and sharpness were rated by the following criterion.

⊚: Smoothness and sharpness are excellent.

○: Smoothness and sharpness are acceptable.

Δ: Slight unevenness (smoothness) and slight cloudiness (sharpness).

X: Smoothness and sharpness are inferior.

(2) Scratch resistance

The surface of the coating film of a test plate was rubbed with a brush using a 0.3% cleanser suspension, and the gloss of the surface was measured before and after the rubbing to calculate a gloss retention (%).

The scratch resistance of the coating film was rated based on the level of gloss retention (%), according to the following criterion.

○: The coating film has a gloss retention of more than 60% and has sufficient scratch resistance.

Δ: The coating film has a gloss retention of 40–60% and has insufficient scratch resistance.

X: The coating film has a gloss retention of less than 40% and has inferior scratch resistance.

(3) Weathering resistance

A coating film was subjected to a 4000-hour acceleration test by a QUV tester, and the gloss (60°) of the coating film was measured before and after the test to calculate a gloss retention (%).

The weathering resistance of the coating film was rated based on the level of gloss retention (%) according to the following criterion.

⊚: The coating film has a gloss retention of more than 80%.

○: The coating film has a gloss retention of 70–80%.

Δ: The coating film has a gloss retention of 60–70%.

X: The coating film has a gloss retention of less than 60%.

(4) Acid resistance 40 volume % of sulfuric acid was dropped on a coating film, followed by standing at 60° C. for 20 minutes. The resulting coating film was washed with water and observed for appearance. The acid resistance of the coating film was rated according to the following criterion.

○: No corrosion of coating film

Δ: Slight corrosion of coating film

X: Distinct corrosion of coating film (5) Storage stability

A powder paint composition was stored at 30° C. and 90% (R.H.) for 1 month and then made into pellets of 10 mm (diameter) and 0.6 g. The pellets were adhered onto a plate, and the resulting plate was kept vertically and subjected to curing at 140° C. for 30 minutes to measure the sagging of the pellets.

○: Sagging of more than 20 mm

Δ: Sagging of 10–20 mm

X: Sagging of less than 10 mm

The above evaluation results for powder paints are shown in Tables 4 and 5 (Examples) and Table 6 (Comparative Examples).

TABLE 4

Results

| | Co-polymer (A) | Poly-carboxylic acid (B) | Linear anhydride (C) | Amine (E) | Smoothness | Sharpness | Gloss | Impact resistance | Adhesivity | Solvent resistance | Acid resistance | Scratch resistance | Weathering resistance | Storage stability |
|---|---|---|---|---|---|---|---|---|---|---|---|---|---|---|
| | Parts by weight | | | | | | | | | | | | | |
| Example 9 | A-1 71.4 | DDA 11.6 | DDA-Ah 17.0 | M2HT 1.0 | ⊙ | ⊙ | 93 | 40 | 8< | ⊙ | ○ | ○ | ⊙ | ○ |
| Example 10 | A-2 76.9 | DDA 9.3 | DDA-Ah 13.8 | M2HT 1.0 | ⊙ | ⊙ | 95 | 40 | 8< | ⊙ | ○ | ○ | ⊙ | ○ |
| Example 11 | A-3 66.6 | DDA 13.5 | DDA-Ah 19.9 | M2HT 1.0 | ○ | ⊙ | 90 | 45 | 8< | ⊙ | ○ | ○ | ⊙ | Δ |
| Example 12 | A-1 73.9 | SBA 10.5 | SBA-Ah 15.6 | M2HT 1.0 | ⊙ | ○ | 85 | 40 | 7 | ⊙ | ○ | ○ | ⊙ | ○ |
| Example 13 | A-1 72.4 | SBA 10.3 | DDA-Ah 17.3 | M2HT 1.0 | ⊙ | ○ | 88 | 40 | 7.5 | ⊙ | ○ | ○ | ⊙ | ○ |
| Example 14 | A-1 72.8 | DDA 11.8 | SBA-Ah 15.4 | M2HT 1.0 | ⊙ | ○ | 87 | 40 | 7 | ⊙ | ○ | ○ | ⊙ | ○ |
| Example 15 | A-1 71.4 | DDA 11.6 | DDA-Ah 17.0 | TBA 1.0 | ⊙ | ⊙ | 88 | 40 | 8< | ⊙ | ○ | ○ | ○ | ○ |
| Example 16 | A-8 76.9 | DDA 9.3 | DDA-Ah 13.8 | M2HT 1.0 | ○ | ⊙ | 87 | 40 | 8< | ⊙ | ○ | ○ | ⊙ | Δ |
| Example 17 | A-9 64.4 | DDA 14.4 | DDA-Ah 21.2 | M2HT 1.0 | ○ | ○ | 85 | 45 | 8< | ⊙ | ○ | ○ | ⊙ | Δ |

TABLE 5

Results

| | Co-polymer (A) | Poly-carboxylic acid (B) | Linear anhydride (C) | Amine (E) | Smoothness | Sharpness | Gloss | Impact resistance | Adhesivity | Solvent resistance | Acid resistance | Scratch resistance | Weathering resistance | Storage stability |
|---|---|---|---|---|---|---|---|---|---|---|---|---|---|---|
| | Parts by weight | | | | | | | | | | | | | |
| Example 18 | A-10 76.9 | DDA 9.3 | DDA-Ah 13.8 | M2HT 1.0 | ⊙ | ⊙ | 97 | 40 | 8< | ⊙ | ○ | ○ | ○ | ○ |
| Example 19 | A-1 67.6 | DDA 6.6 | DDA-Ah 25.8 | M2HT 1.0 | ○ | ○ | 95 | 40 | 7.5 | ⊙ | ○ | ○ | ⊙ | Δ |
| Example 20 | A-1 71.4 | DDA 11.6 | DDA-Ah 17.0 | | ⊙ | ⊙ | 95 | 40 | 8< | ○ | ○ | ○ | ○ | ○ |

TABLE 6

Results

| | Co-polymer (A) | Poly-carboxylic acid (B) | Linear anhydride (C) | Amine (E) | Smoothness | Sharpness | Gloss | Impact resistance | Adhesivity | Solvent resistance | Acid resistance | Scratch resistance | Weathering resistance | Storage stability |
|---|---|---|---|---|---|---|---|---|---|---|---|---|---|---|
| | Parts by weight | | | | | | | | | | | | | |
| Comparative Example 10 | A-4 71.4 | DDA 11.6 | DDA-Ah 17.0 | M2HT 1.0 | Δ | ○ | 75 | 40 | 8< | ⊙ | ○ | ○ | ○ | x |
| Comparative Example 11 | A-5 76.9 | DDA 9.3 | DDA-Ah 13.8 | M2HT 1.0 | ⊙ | ⊙ | 91 | 40 | 8< | ⊙ | ○ | ○ | x | Δ |
| Comparative Example 12 | A-6 86.9 | DDA 5.3 | DDA-Ah 7.8 | M2HT 1.0 | ⊙ | ⊙ | 95 | 15> | 1 | x | x | x | x | Δ |
| Comparative Example 13 | A-7 60.5 | DDA 15.9 | DDA-Ah 23.6 | M2HT 1.0 | x | x | 50 | 45 | 8< | ⊙ | ○ | Δ | ⊙ | x |
| Comparative Example 14 | A-1 75.5 | DDA 24.5 | | M2HT 1.0 | Δ | Δ | 80 | 35 | 6 | x | x | x | Δ | ○ |
| Comparative | A-1 | | DDA-Ah | M2HT | ⊙ | Δ | 90 | 30 | 4 | ○ | Δ | Δ | Δ | x |

TABLE 6-continued

Results

| | Co-polymer (A) | Poly-carboxy-lic acid (B) | Linear anhydride (C) | Amine (E) | Smooth-ness | Sharp-ness | Gloss | Impact resis-tance | Ad-hesivity | Solvent resis-tance | Acid resis-tance | Scratch resis-tance | Weather-ing resistance | Storage stability |
|---|---|---|---|---|---|---|---|---|---|---|---|---|---|---|
| | | Parts by weight | | | | | | | | | | | | |
| Example 15 | 67.6 | | 32.4 | 1.0 | ⊚ | ⊚ | 90 | 40 | 8< | ⊚ | ○ | ○ | ○ | x |
| Comparative Example 16 | A-1 71.4 | DDA 11.6 | DDA-Ah 17.0 | TEA 1.0 | | | | | | | | | | |
| Comparative Example 17 | A-1 71.4 | DDA 11.6 | DDA-Ah 17.0 | TPP 1.0 | x | x | 85 | 40 | 8< | ⊚ | ○ | ○ | ⊚ | x |

In Tables 4 and 5, the powder paints of Examples 9–19 fall in the scope of claims of the present invention but differ in the amount of glycidyl group in copolymer, the styrene content in copolymer, the proportions of functional groups of resin and curing agent during production of powder paint, the kind of curing agent, and the kind of curing catalyst. These paints have excellent storage stability and give a coating film of excellent properties and appearance.

Comparative Example 11 is an example using a copolymer containing no styrene, and the paint had inferior storage stability and gave a coating film of inferior appearance and gloss. Comparative Example 12 is an example using a copolymer containing styrene in excess, and the paint gave a coating film of inferior weathering resistance.

Comparative Examples 13 and 14 are each an example using a copolymer containing glycidyl group in an amount not falling in the range specified by the present invention. When the amount of glycidyl group was too small (Comparative Example 13), the paint gave a coating film inferior in properties including weathering resistance. When the amount of glycidyl group was too large (Comparative Example 14), the paint had inferior storage stability and gave a coating film of inferior appearance.

Comparative Examples 15 and 16 are each an example not using, as a curing agent, a combination of an aliphatic polycarboxylic acid and a linear anhydride of an aliphatic polycarboxylic acid, in production of powder paint. When only an aliphatic polycarboxylic acid was used (Comparative Example 15), the paint gave a coating film of inferior appearance and properties. When only a linear anhydride of an aliphatic polycarboxylic acid was used (Comparative Example 16), the paint had inferior storage stability and gave a coating film of inferior properties.

Comparative Example 17 is an example using a liquid tertiary amine as a curing catalyst, and Comparative Example 18 is an example using triphenylphosphine as a curing catalyst. In these cases, the respective paints had inferior storage stability.

Example 20

A powder paint was prepared using no amine compound (E). Using this paint, a test plate was prepared in accordance with the above-mentioned coating and curing (3) (the curing temperature was changed to 160° C.). Then, performance evaluation of the powder paint was conducted according to the methods mentioned in Examples 9–19, and the results are shown in Table 5. The powder paint showed satisfactory performance because the curing temperature was 160° C.

Examples 21–23 and Comparative Examples 19–20
[Preparation (3) of powder paints]

There were compounded, in the proportions shown in Table 7, the copolymer (A-1), an aliphatic polycarboxylic acid (B), a linear anhydride (C) of an aliphatic polycarboxylic acid and, as necessary, a salt (D) between tertiary amine compound and organic acid or a tertiary amine compound (E) having a melting point of about 20°–150° C. and titanium oxide. Thereto were added 1 part by weight of Resimix RL-4 (a low-viscosity acrylic acid as a flow control agent, a product of Mitsui Toatsu Chemicals, Inc.), 1 part by weight of Tinuvin 144 (a photostabilizer, a product of Ciba-Geigy Corp.), 1 part by weight of benzoin (an anti-popping agent) and 2 parts by weight of Tinuvin 900 (an ultra-violet light absorber, a product of Ciba-Geigy Corp.) [all of said amounts are per 100 parts by weight of the total of (A), (B), (C) and titanium oxide]. The resulting mixture was melt-kneaded at 90° C. by the use of a heated roll, then cooled, and finely ground by the use of a grinder to recover the portion which had passed through a screen of 150 mesh, whereby various powder coatings were prepared.

[Preparation of test plates by coating and curing (4)]

Each of the above-prepared powder paints was coated, by electrostatic coating, on a steel plate coated with a cationic electrocoating, in a film thickness of 60–70μ, and cured at 160° C. for 30 minutes to obtain various test plates.

[Performance evaluation]

Each powder paint was subjected to performance evaluation for the five common property items by the test methods described previously and also for the following other property items by the following test methods.

(1) Appearance (visual)

A coating film was observed for appearance, and its smoothness and sharpness were rated by the following criterion.

⊚: Smoothness and sharpness are excellent.
○: Smoothness and sharpness are acceptable.
Δ: Slight unevenness (smoothness) and slight cloudiness (sharpness).
X: Smoothness and sharpness are inferior.

(2) Chipping resistance by flying stone impact test

There was used a gravelometer (a product of Suga Test Instruments Co., Ltd.) conforming to SAE-J400 (a U.S. test method for automobile paint) and ASTM D 370.

A coated steel plate was allowed to stand in a refrigerator of –20° C. for 4 hours. Immediately thereafter, the plate was cooled in a dry ice-methanol bath of −30° C. for 5 minutes and pulled up from the bath. Then, the plate was set in the gravelometer, and 50 g of crushed stone for road use was allowed to hit the plate in a moment.

The time from pulling up from the bath to the spraying of crushed stone was not longer than 5 seconds. The air pressure used for spraying was 4 kgf/cm² (gauge).

The steel plate damaged by the hitting of crushed stone was allowed to stand at room temperature for 10 minutes, after which the portions of the coating film showing slight or partial separation were completely removed using an adhesive tape.

The chipping resistance of coating film formed on steel plate was expressed by the average diameter of scars. Therefore, a smaller scar diameter indicates better chipping resistance. A coating film which gave a scar diameter of 1.5 mm or less, was rated as a coating film of good chipping resistance.

The results are shown in Table 7.

test plate was measured by the use of a color difference meter. When the Δb was 1.0 or more, the coating film of the test plate was rated as having yellowness. Separately, each test plate was subjected to a 3000-hour acceleration test by the use of a QUV tester to examine the yellowing tendency of the coating film of the test plate. When the Δb after the acceleration test was at least 0.5 larger than the Δb before the acceleration test, the coating film was rated as having caused yellowing.

The test results are shown below.

| Run No. | Powder paint | Styrene cont. in (A) (wt. %) | Δb before accel. test | Δb after accel. test |
|---|---|---|---|---|
| 24-1 | Ex. 5 | 5 | 0.1 | 0.3 |
| 24-2 | Ex. 1 | 10 | 0.3 | 0.5 |
| 24-3 | Ex. 7 | 25 | 0.9 | 0.9 |
| 24-4 | Comp. Ex. 2 | 45 | 3.5 | 4.4 |

TABLE 7

| | | | | | | Results | | | | | | |
|---|---|---|---|---|---|---|---|---|---|---|---|---|
| | Copolymer (A) | Poly-carboxylic acid (B) | Linear anhydride (C) | Amine salt (D) | Amine (E) | $TiO_2$ | Smoothness | Sharpness | Gloss | Impact resistance | Adhesivity | Solvent resistance | Chippping resistance |
| | Parts by weight | | | | | | | | | | | |
| Example 21 | A-1 57.1 | DDA 9.3 | DDA-Ah 13.6 | | | 20.0 | ⊚ | ⊚ | 90 | 40 | 8< | ○ | 1.3 mm good |
| Example 22 | A-1 57.1 | DDA 9.3 | DDA-Ah 13.6 | DBU-Fa 1.0 | | 20.0 | ⊚ | ○ | 85 | 40 | 8< | ⊚ | 0.9 mm good |
| Example 23 | A-1 57.1 | DDA 9.3 | DDA-Ah 13.6 | | M2HT 1.0 | 20.0 | ⊚ | ⊚ | 88 | 40 | 8< | ⊚ | 1.1 mm good |
| Comparative Example 18 | A-1 60.4 | DDA 19.6 | | | M2HT 1.0 | 20.0 | ○ | Δ | 80 | 35 | 6 | x | 2.7 mm poor |
| Comparative Example 19 | A-1 54.1 | | DDA-Ah 25.6 | | M2HT 1.0 | 20.0 | ⊚ | Δ | 85 | 30 | 4 | ○ | 2.2 mm poor |

In Table 7, Examples 21–23 are each an example falling in the scope of claims of the present invention. The respective paints have excellent storage stability and give a coating film superior in properties, appearance and chipping resistance.

Comparative examples 19 and 20 are each an example using, as a curing agent, no combination of an aliphatic polycarboxylic acid and a linear anhydride of an aliphatic polycarboxylic acid. When only an aliphatic polycarboxylic acid was used (Comparative Example 19), the paint gave a coating film of inferior solvent resistance and chipping resistance. When only a linear anhydride of an aliphatic polycarboxylic acid was used (Comparative Example 20), the paint gave a coating film of inferior properties, adhesivity and chipping resistance.

Example 24

(Test for yellowness and yellowing tendency)

A melamine-crosslinked acrylic resin white paint was coated on a Satin-finish steel plate of 0.8 mm (thickness) treated with zinc phosphate, in a film thickness of 30μ, to prepare a surface-treated steel plate. On this surface-treated steel plate was coated, by electrostatic coating, one of the powder paints of Examples 1, 5 nd 7 and Comparative Example 2 in a film thickness of 60–70μ, followed by curing at 140° C. for 30 minutes to prepare test plates.

The whiteness difference (Δb) between the coating film of the surface-treated steel plate and the coating film of each As is clear from the above, when the styrene content in copolymer (A) exceeded 30% by weight, the coating film had yellowness and caused yellowing.

Examples 25–26 and Comparative Examples 20–21

[Preparation of test plates by coating and curing (5)]

On a steel plate treated with zinc phosphate was coated a melamine-crosslinked acrylic resin white paint so as to give a coating film of 30μ in thickness, to prepare a surface-treated steel plate. On the surface-treated steel plate was coated a silver metallic melamine-crosslinked acrylic resin aqueous base coat so as to give a coating film (after cure) of 15 μ in thickness; curing was conducted for 10 minutes; and preliminary drying was conducted at 100° C. for 5 minutes. Then, one of the powder paints shown in Table 8 was coated, by electrostatic coating, so as to give a coating film of 60–70 μ in thickness, followed by curing at 140° C. for 30 minutes to prepare various test plates.

[Performance evaluation]

Each coating film on each test plate was evaluated by the following test methods and the following criterion.

(1) Appearance (visual)

A coating film was observed for appearance, and its smoothness and sharpness were rated by the following criterion.

⊚: Smoothness and sharpness are excellent.

○: Smoothness and sharpness are acceptable.

Δ: Slight unevenness (smoothness) and slight cloudiness (sharpness).

X: Smoothness and sharpness are inferior.

(2) Adhesivity

Measured by the use of an Erichsen tester, and expressed as a degree (mm) of peeling when peeling of coating film occurred.

(3) Weathering resistance

A coating film was subjected to a 4000-hour acceleration test by a QUV tester, and the gloss (60°) of the coating film was measured before and after the test to calculate a gloss retention (%).

The weathering resistance of the coating film was rated based on the level of gloss retention (%) according to the following criterion.

⊚: The coating film has a gloss retention of more than 80%.

○: The coating film has a gloss retention of 70–80%.

Δ: The coating film has a gloss retention of 60–70%.

X: The coating film has a gloss retention of less than 60%.

The evaluation results are shown in Table 8.

(E) a tertiary amine compound having a melting point of about 20°–150° C.

2. A thermosetting powder paint according to claim 1, wherein the component (A) has a glass transition temperature of about 20°–100° C. as measured by Fox's formula and a number-average molecular weight of about 1,000–30,000.

3. A thermosetting powder paint according to claim 2, wherein the amount of the carboxyl group in the aliphatic polycarboxylic acid (B) is 0.1–1.2 equivalents and the amount of the acid anhydride group in the linear anhydride (C) of an aliphatic polycarboxylic acid is 0.1–1.2 equivalents, both per equivalent of the glycidyl group in the molecule of the copolymer (A), the total of the amount of the carboxyl group in (B) and the amount of the acid anhydride group in (C) being 0.5–2 equivalents per equivalent of the glycidyl group in the molecule of the copolymer (A).

4. A thermosetting powder paint according to claim 2, wherein the amount of the carboxyl group in the aliphatic polycarboxylic acid (B) is about 0.3–0.8 equivalent and the amount of the acid anhydride group in the linear anhydride (C) of an aliphatic polycarboxylic acid is about 0.2–0.6 equivalent, both per equivalent of the glycidyl group in the

TABLE 8

| | Copolymer (A) | Polycarboxylic acid (B) | Linear anhydride (C) | Amine salt (D) | Amine (E) | Smoothness | Sharpness | Adhesivity | Weathering resistance |
|---|---|---|---|---|---|---|---|---|---|
| | | | Parts by weight | | | | | | |
| Example 25 | A-1 71.4 | DDA 11.6 | DDA-Ah 17.0 | DBU-Fa 1.0 | | ⊚ | ⊚ | 8< | ⊚ |
| Example 26 | A-1 71.4 | DDA 11.6 | DDA-Ah 17.0 | | M2HT 1.0 | ⊚ | ⊚ | 8< | ⊚ |
| Comparative Example 20 | A-1 75.5 | DDA 24.5 | | | M2HT 1.0 | Δ | X | 6 | Δ |
| Comparative Example 21 | A-1 67.6 | | DDA-Ah 32.4 | | M2HT 1.0 | ○ | X | 4 | Δ |

As is clear from Table 8, the powder paints of Examples 25–26 fall in the scope of claims of the present invention and each give a coating film of excellent appearance and properties.

Meanwhile, Comparative Example 20 is an example using only an aliphatic polycarboxylic acid as a curing agent, and Comparative Example 21 is an example using a linear anhydride of an aliphatic polycarboxylic acid as a curing agent; and the resulting coating films were each inferior in appearance to those of Examples.

What is claimed is:

1. A thermosetting powder paint comprising:

(A) a copolymer obtained by polymerizing a system containing:

(a1) more than 20 parts by weight but not more than 60 parts by weight of an ethylenically unsaturated monomer having, in the molecule, at least one glycidyl group and at least one unsaturated double bond, (a2) 1–30 parts by weight of styrene, and (a3) 10–79 parts by weight of an ethylenically unsaturated monomer having, in the molecule, neither carboxyl group nor tert-butyl ester group, the total of the monomers (a1), (a2) and (a3) being 100 parts by weight, (B) an aliphatic polycarboxylic acid, (C) a linear anhydride of an aliphatic polycarboxylic acid, and (D) a salt between a tertiary amine compound and an organic acid, and/or molecule of the copolymer (A), the total of the amount of the carboxyl group in (B) and the amount of the acid anhydride group in (C) being about 0.7–1.2 equivalents per equivalent of the glycidyl group in the molecule of the copolymer (A).

5. A thermosetting powder paint comprising:

(A) a copolymer which is composed of:

(a1) 20–60% by weight of a monomer having a glycidyl group and an unsaturated double bond, (a2) 1–30% by weight of styrene, and (a3) 10–79% by weight of other monomers having no carboxyl group in the molecule, radical-copolymerizable with (a1) and (a2), and which has a glass transition temperature of 20–100° C. and a number-average molecular weight of 2,000–10,000, (B) an aliphatic dibasic acid, (C) a linear anhydride of an aliphatic polycarboxylic acid, and (D) an organic amine salt, in which paint the number of the carboxyl group in the aliphatic dibasic acid (B) is 0.1–1.2 per one glycidyl group in the copolymer (A); the number of the acid anhydride group in the linear anhydride (C) of an aliphatic polycarboxylic acid is 0.1–1.2 per one glycidyl group in the copolymer (A); the total of the number of the carboxyl group in (B) and the number of the acid anhydride group in (C) is 0.5–2 per one glycidyl group in the copolymer (A); and the amount of the organic amine salt (D) is 0.01–3 parts by weight per 100 parts by weight of the total of (A), (B) and (C).

6. A thermosetting powder paint comprising:

(A) a copolymer having a glass transition temperature of about 20°–100° C. and a number-average molecular weight of about 2,000–10,000, obtained by polymerizing a system containing:
- (a1) more than 20 parts by weight but not more than 60 parts by weight of a monomer having a glycidyl group and an unsaturated double bond,
- (a2) 1–30 parts by weight of styrene, and
- (a3) 10–79 parts by weight of other monomers having, in the molecule, neither carboxyl group nor glycidyl group, the total of the monomers (a1), (a2) and (a3) being 100 parts by weight, (B) an aliphatic polycarboxylic acid, (C) a linear anhydride of an aliphatic polycarboxylic acid, and (E) a solid amine compound, in which paint the amount of the carboxyl group in the aliphatic polycarboxylic acid (B) is 0.1–1.2 equivalents per equivalent of the glycidyl group in the copolymer (A); the amount of the acid anhydride group in the linear anhydride (C) of an aliphatic polycarboxylic acid is 0.1–1.2 equivalents per equivalent of the glycidyl group in the copolymer (A); the total of the amount of the carboxyl group in (B) and the amount of the acid anhydride group in (C) is 0.5–2 equivalents per equivalent of the glycidyl group in the copolymer (A); and the amount of the solid amine compound (E) is 0.01–3 parts by weight per 100 parts by weight of the total of (A), (B) and (C).

7. A thermosetting powder paint according to claim 1, wherein the amount of the salt (D) between a tertiary amine compound and an organic acid is about 0.01–3 parts by weight per 100 parts by weight of the total of the copolymer (A), the aliphatic polycarboxylic acid (B) and the linear anhydride (C) of an aliphatic polycarboxylic acid.

8. A thermosetting powder paint according to claim 1, wherein the amount of the tertiary amine compound (E) having a melting point of about 20°–150° C. is about 0.01–3 parts by weight per 100 parts by weight of the total of the copolymer (A), the aliphatic polycarboxylic acid (B) and the linear anhydride (C) of an aliphatic polycarboxylic acid.

9. A thermosetting powder paint according to claim 7, wherein the salt (D) between a tertiary amine compound and an organic acid is a salt between 1,8-diazabicyclo[5.4.0]-7-undecene and an organic acid.

10. A thermosetting powder paint according to claim 8, wherein the tertiary amine compound (E) having a melting point of about 20°–150° C. is at least one compound selected from the group consisting of tertiary amine compounds having a structure of N-methyl-N,N-dialkylamine wherein the alkyl has 2–30 carbon atoms.

11. A thermosetting powder paint according to claim 1, wherein the copolymer (A) is obtained by polymerizing a system containing:
- 20–60 parts by weight of the monomer (a1),
- 10–30 parts by weight of the monomer (a2), and
- 10–70 parts by weight of the monomer (a3), the total of (a1), (a2) and (a3) being 100 parts by weight.

12. A thermosetting powder paint according to claim 1, wherein the copolymer (A) is obtained by polymerizing a system containing:
- 25–50 parts by weight of the monomer (a1),
- 10–20 parts by weight of the monomer (a2), and
- 25–65 parts by weight of the monomer (a3), the total of (a1), (a2) and (a3) being 100 parts by weight.

13. A thermosetting powder paint according to claim 12, wherein the copolymer (A) has a number-average molecular weight of about 2,000–10,000.

14. A thermosetting powder paint according to claim 13, wherein the linear anhydride (C) of an aliphatic polycarboxylic acid is a dehydration and condensation product of the aliphatic polycarboxylic acid (B).

15. A thermosetting powder paint according to claim 13, wherein the aliphatic polycarboxylic acid (B) is dodecanedioic acid.

16. A thermosetting powder paint according to claim 13, wherein the linear anhydride (C) of an aliphatic polycarboxylic acid is a dehydration and condensation product of dodecanedioic acid.

17. A thermosetting powder paint according to claim 14, wherein the aliphatic polycarboxylic acid (B) is dodecanedioic acid.

18. A method for coating an automobile body or an automobile part with a thermosetting powder paint of claim 1.

19. A method for applying top coating to an automobile body or an automobile part with a thermosetting powder paint of claim 1.

20. A method for applying, on a pigmented or metallic aqueous coating as a basecoat, a thermosetting powder paint composition of claim 1 as a top coat by electrostatic coating, and then curing the basecoat and the top coat simultaneously.

21. A method for applying intermediate coating to an automobile body or an automobile part with a thermosetting powder paint of claim 1.

22. A method for forming a coating film with a thermosetting powder paint of claim 1.

23. A coating film formed with a thermosetting powder paint of claim 1.

24. An automobile coated with a thermosetting powder paint of claim 1.

25. An automobile part coated with a thermosetting powder paint of claim 1.

26. A process for producing a thermosetting powder paint, which comprises melt-kneading a mixture containing the components mentioned in claim 1, at a temperature of about 40°–130° C., followed by cooling and grinding.

27. A coating method comprising adhering a thermosetting powder paint produced in claim 26, to a material to be coated and then curing the adhered paint at about 100°–180° C.

28. A coating method comprising adhering, by electrostatic coating, a thermosetting powder paint produced in claim 26, to a material to be coated and then curing the adhered paint at about 100°–180° C.

* * * * *

UNITED STATES PATENT AND TRADEMARK OFFICE
CERTIFICATE OF CORRECTION

PATENT NO. : 5,728,790
DATED : March 17, 1998
INVENTOR(S) : Masashi Seki et al

It is certified that error appears in the above-identified patent and that said Letters Patent is hereby corrected as shown below:

On the title page, item [56] Foreign Patent Documents, please add the following documents.

| | | |
|---|---|---|
| 0509393 | 10/92 | Europe |
| 4032391 | 4/92 | Germany |

Signed and Sealed this

Ninth Day of March, 1999

Attest:

Attesting Officer

Q. TODD DICKINSON

Acting Commissioner of Patents and Trademarks